(12) United States Patent
Choi et al.

(10) Patent No.: US 12,219,162 B2
(45) Date of Patent: Feb. 4, 2025

(54) METHOD FOR SIGNALING PICTURE HEADER IN CODED VIDEO STREAM

(71) Applicant: TENCENT AMERICA LLC, Palo Alto, CA (US)

(72) Inventors: Byeongdoo Choi, Palo Alto, CA (US); Shan Liu, Palo Alto, CA (US); Stephan Wenger, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/196,073

(22) Filed: May 11, 2023

(65) Prior Publication Data
US 2023/0283793 A1 Sep. 7, 2023

Related U.S. Application Data

(63) Continuation of application No. 17/096,168, filed on Nov. 12, 2020, now Pat. No. 11,706,428.

(60) Provisional application No. 63/005,640, filed on Apr. 6, 2020.

(51) Int. Cl.
*H04N 7/12* (2006.01)
*H04N 19/169* (2014.01)
*H04N 19/172* (2014.01)
*H04N 19/44* (2014.01)
*H04N 19/46* (2014.01)

(52) U.S. Cl.
CPC ........... *H04N 19/44* (2014.11); *H04N 19/172* (2014.11); *H04N 19/188* (2014.11); *H04N 19/46* (2014.11)

(58) Field of Classification Search
CPC .... H04N 19/44; H04N 19/172; H04N 19/188; H04N 19/46; H04N 19/174; H04N 19/70; H04N 19/127; H04N 19/169; H04N 19/196; H04N 19/37
See application file for complete search history.

(56) References Cited

U.S. PATENT DOCUMENTS

| 11,516,502 B2 * | 11/2022 | Furht ................... H04N 19/527 |
| 2006/0050793 A1 | 3/2006 | Wang et al. |
| 2013/0136716 A1 | 5/2013 | Enstrom et al. |

(Continued)

FOREIGN PATENT DOCUMENTS

| CN | 115299053 A | 11/2022 |
| WO | 2021/195588 A1 | 9/2021 |

OTHER PUBLICATIONS

Vetro et al., "Overview of the Stereo and Multiview Video Coding Extensions of the H.264/MPEG-4 AVC Standard", Proceedings of the IEEE 99.4, 2011, pp. 1-15 (16 pages total).

(Continued)

*Primary Examiner* — Gims S Philippe
(74) *Attorney, Agent, or Firm* — Sughrue Mion, PLLC

(57) ABSTRACT

A method of decoding an encoded video bitstream using at least one processor includes obtaining a video coding layer (VCL) network abstraction layer (NAL) unit; determining whether the VCL NAL unit is a first VCL NAL unit of a picture unit (PU) containing the VCL NAL unit; based on determining that the VCL NAL unit is the first VCL NAL unit of the PU, determining whether the VCL NAL unit is a first VCL NAL unit of an access unit (AU) containing the PU; and based on determining that the VCL NAL unit is the first VCL NAL unit of the AU, decoding the AU based on the VCL NAL unit.

17 Claims, 9 Drawing Sheets

600A

(56) References Cited

U.S. PATENT DOCUMENTS

| | | |
|---|---|---|
| 2013/0222538 A1 | 8/2013 | Chen et al. |
| 2014/0016707 A1 | 1/2014 | Wang |
| 2014/0016708 A1 | 1/2014 | Wang |
| 2014/0086332 A1 | 3/2014 | Wang |
| 2014/0086333 A1 | 3/2014 | Wang |
| 2014/0092994 A1 | 4/2014 | Wang |
| 2014/0119436 A1 | 5/2014 | Mathew et al. |
| 2015/0271528 A1 | 9/2015 | Wang et al. |
| 2015/0271529 A1 | 9/2015 | Wang et al. |
| 2015/0381998 A1 | 12/2015 | Wang et al. |
| 2016/0057441 A1 | 2/2016 | Skupin et al. |
| 2016/0212439 A1 | 7/2016 | Hannuksela |
| 2016/0373771 A1 | 12/2016 | Hendry et al. |
| 2020/0092570 A1 | 3/2020 | Wenger et al. |
| 2020/0154144 A1 | 5/2020 | Deshpande |
| 2020/0389655 A1 | 12/2020 | Seregin et al. |
| 2021/0329303 A1* | 10/2021 | Deshpande ............ H04N 19/70 |
| 2022/0060684 A1* | 2/2022 | Luo ...................... H04N 19/132 |
| 2022/0217415 A1* | 7/2022 | Hendry .................. H04N 19/70 |
| 2022/0239949 A1* | 7/2022 | Hannuksela ......... H04N 21/435 |

OTHER PUBLICATIONS

Extended European Search Report dated May 31, 2022 in European Application No. 21784959.5.
Jonatan Samuelsson et al., "AHG9: Picture Header in Slice Header", Joint Video Experts Team (JVET) of ITU-T SG 16 WP 3 and ISO/IEC JTC 1/SC 29/WG 11, JVET-P2001-vE, 17th Meeting: Brussels, BE, Jan. 7-17, 2020, pp. 1-5 (7 pages total).
Benjamin Bross et al., "Versatile Video Coding (Draft 8)", Joint Video Experts Team (JVET) of ITU-T SG 16 WP 3 and ISO/IEC JTC 1/SC 29/WG 11, JVET-Q2001-v9, 17th Meeting: Brussels, BE, Jan. 7-17, 2020, pp. 90-91 (5 pages total).
Jie Chen et al., "AHG9: On Picture Header", Joint Video Experts Team (JVET) of ITU-T SG 16 WP 3 and ISO/IEC JTC 1/SC 29/WG 11, 2020, JVET-R0163-v2, 18th Meeting, by teleconference, Apr. 15-24, 2020 (5 pages total).
Communication dated Nov. 29, 2022, issued in Indian Application No. 202147050791.
Written Opinion of the International Searching Authority issued Jun. 28, 2021 in International Application No. PCT/US2021/025309.
Benjamin Bross et al., "Versatile Video Coding (Draft 8)", Joint Video Experts Team (JVET) of ITU-T SG 16 WP 3 and ISO/IEC JTC 1/SC 29/WG 11, Document JVET-Q2001-vE, Jan. 7-17, 2020, 513 pgs., 17th Meeting: Brussels, BE.
Rickard Sjöberg et al., "AHG9: Picture header enabled flag", Joint Video Experts Team (JVET) of ITU-T SG 16 WP 3 and ISO/IEC JTC 1/SC 29/WG 11, 2020, JVET-Q0426-v2, 17th Meeting, Brussels, BE, Jan. 7-17, 2020, pp. 1-15 (15 pages total).
Office Action issued Oct. 4, 2022 in Japanese Application No. 2021-563114.
Byeongdoo Choi et al., "AHG9: Clean-ups on picture header", Joint Video Experts Team (JVET) of ITU-T SG 16 WP 3 and ISO/IEC JTC 1/SC 29/WG 11, 2020, JVET-R0124, 18th Meeting (3 pages total).
International Search Report issued Jun. 28, 2021 in International Application No. PCT/US2021/025309.
Benjamin Bross et al., "Versatile Video Coding (Draft 7)", Joint Video Experts Team (JVET) of ITU-T SG 16 WP 3 and ISO/IEC JTC 1/SC 29/WG 11, JVET-P2001-vE, 16th Meeting: Geneva, CH, Oct. 1-11, 2019 (497 pages total).
Examination report No. 2 for standard patent application dated Apr. 28, 2023.

* cited by examiner

FIG. 5

| | Descriptor |
|---|---|
| pic_parameter_set_rbsp( ) { | |
| ... | |
| all_pic_coding_info_present_in_ph_flag | u(1) |
| if( all_pic_coding_info_present_in_ph_flag ) { | |
| rpl_info_in_ph_flag | u(1) |
| if( deblocking_filter_override_enabled_flag ) | |
| dbf_info_in_ph_flag | u(1) |
| sao_info_in_ph_flag | u(1) |
| alf_info_in_ph_flag | u(1) |
| if( ( pps_weighted_pred_flag \|\| pps_weighted_bipred_flag ) && rpl_info_in_ph_flag ) | |
| wp_info_in_ph_flag | u(1) |
| qp_delta_info_in_ph_flag | u(1) |
| ~ | |
| ... | |
| } | |

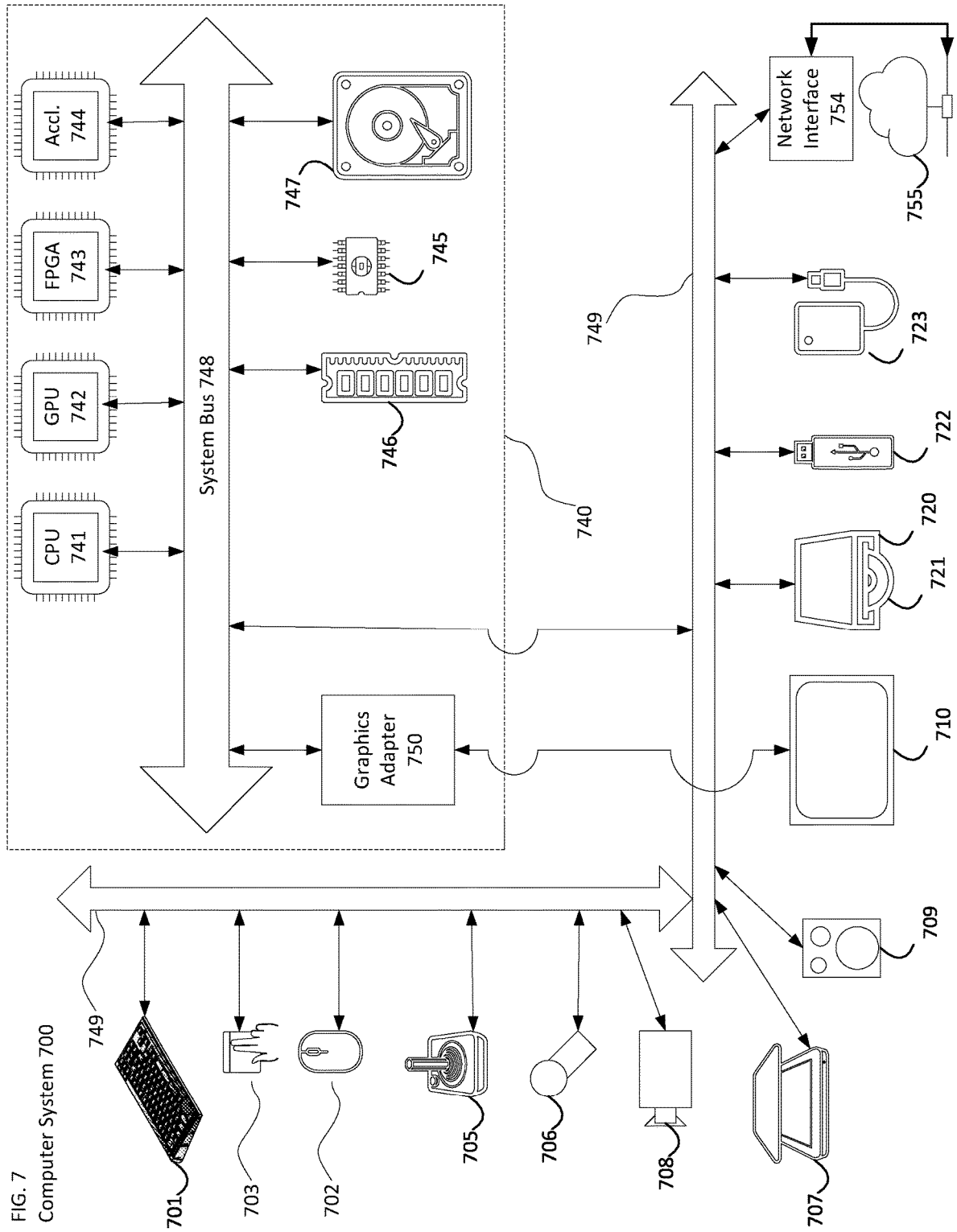

METHOD FOR SIGNALING PICTURE HEADER IN CODED VIDEO STREAM

CROSS-REFERENCE TO RELATED APPLICATION

This is a Continuation of U.S. application Ser. No. 17/096,168, filed on Nov. 12, 2020, which claims priority to U.S. Provisional Application No. 63/005,640, filed on Apr. 6, 2020, in the United States Patent & Trademark Office, the disclosures of which are incorporated herein by reference in their entirety.

FIELD

The disclosed subject matter relates to video coding and decoding, and more specifically, to signaling a picture header in a coded video stream.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC. In October 2017, they issued the Joint Call for Proposals on Video Compression with Capability beyond HEVC (CfP). By Feb. 15, 2018, 22 CfP responses on standard dynamic range (SDR), 12 OP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

SUMMARY

In an embodiment, there is provided a method of decoding an encoded video bitstream using at least one processor, including obtaining a video coding layer (VCL) network abstraction layer (NAL) unit; determining whether the VCL NAL unit is a first VCL NAL unit of a picture unit (PU) containing the VCL NAL unit; based on determining that the VCL NAL unit is the first VCL NAL unit of the PU, determining whether the VCL NAL unit is a first VCL NAL unit of an access unit (AU) containing the PU; and based on determining that the VCL NAL unit is the first VCL NAL unit of the AU, decoding the AU based on the VCL NAL unit.

In an embodiment, there is provided a device for decoding an encoded video bitstream, including at least one memory configured to store program code; and at least one processor configured to read the program code and operate as instructed by the program code, the program code including: first obtaining code configured to cause the at least one processor to obtain a video coding layer (VCL) network abstraction layer (NAL) unit; first determining code configured to cause the at least one processor to determine whether the VCL NAL unit is a first VCL NAL unit of a picture unit (PU) containing the VCL NAL unit; second determining code configured to cause the at least one processor to, based on determining that the VCL NAL unit is the first VCL NAL unit of the PU, determine whether the VCL NAL unit is a first VCL NAL unit of an access unit (AU) containing the PU; and decoding code configured to cause the at least one processor to, based on determining that the VCL NAL unit is the first VCL NAL unit of the AU, decode the AU based on the VCL NAL unit.

In an embodiment, there is provided a non-transitory computer-readable medium storing instructions, the instructions including one or more instructions that, when executed by one or more processors of a device for decoding an encoded video bitstream, cause the one or more processors to: obtain a video coding layer (VCL) network abstraction layer (NAL) unit; determine whether the VCL NAL unit is a first VCL NAL unit of a picture unit (PU) containing the VCL NAL unit; based on determining that the VCL NAL unit is the first VCL NAL unit of the PU, determine whether the VCL NAL unit is a first VCL NAL unit of an access unit (AU) containing the PU; and based on determining that the VCL NAL unit is the first VCL NAL unit of the AU, decode the AU based on the VCL NAL unit.

BRIEF DESCRIPTION OF THE DRAWINGS

Further features, the nature, and various advantages of the disclosed subject matter will be more apparent from the following detailed description and the accompanying drawings in which:

FIG. 5 is a schematic illustration of an examples of a syntax table in accordance with an embodiment.

FIG. 7 is a schematic illustration of a computer system in accordance with an embodiment.

DETAILED DESCRIPTION

Figure 1:
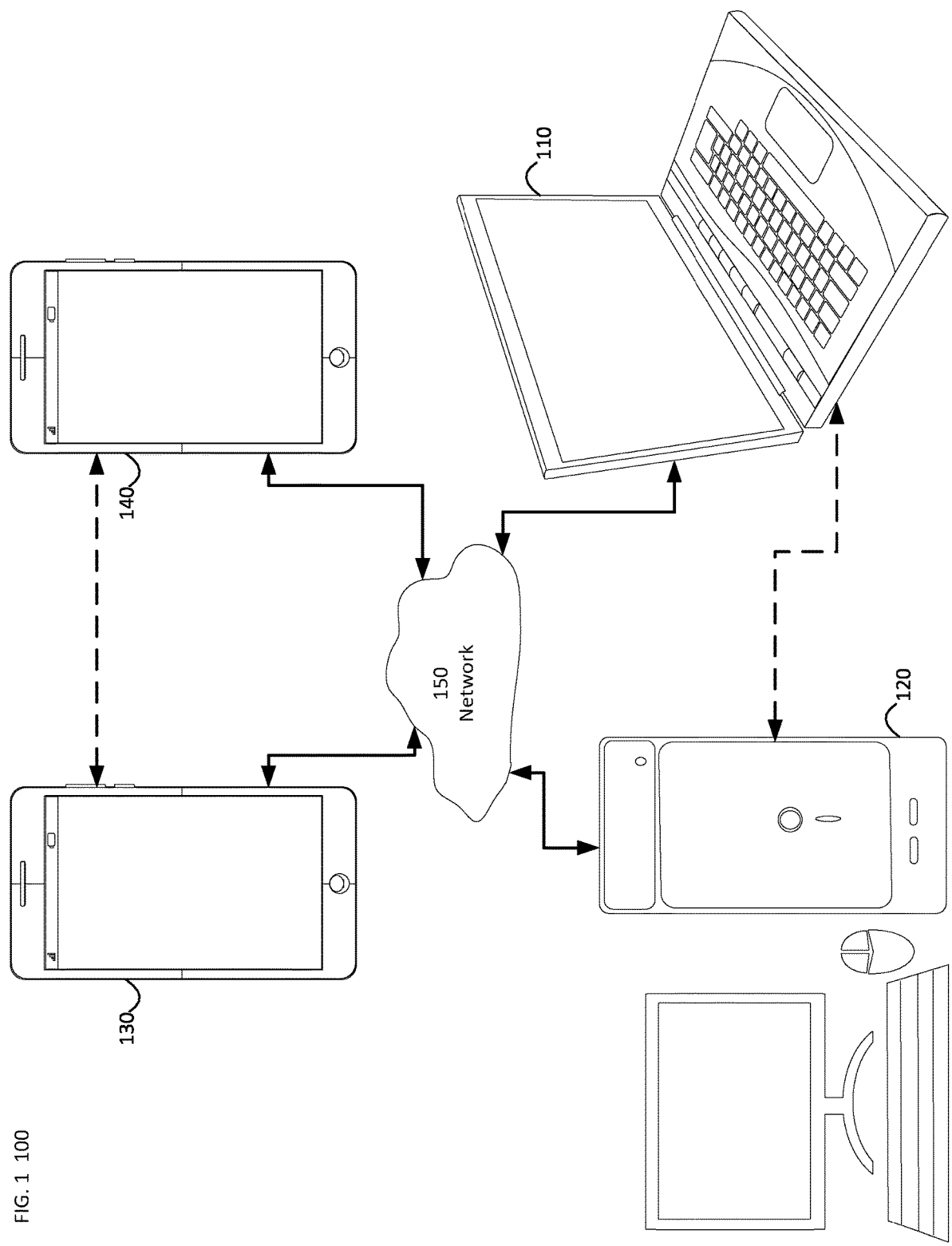
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
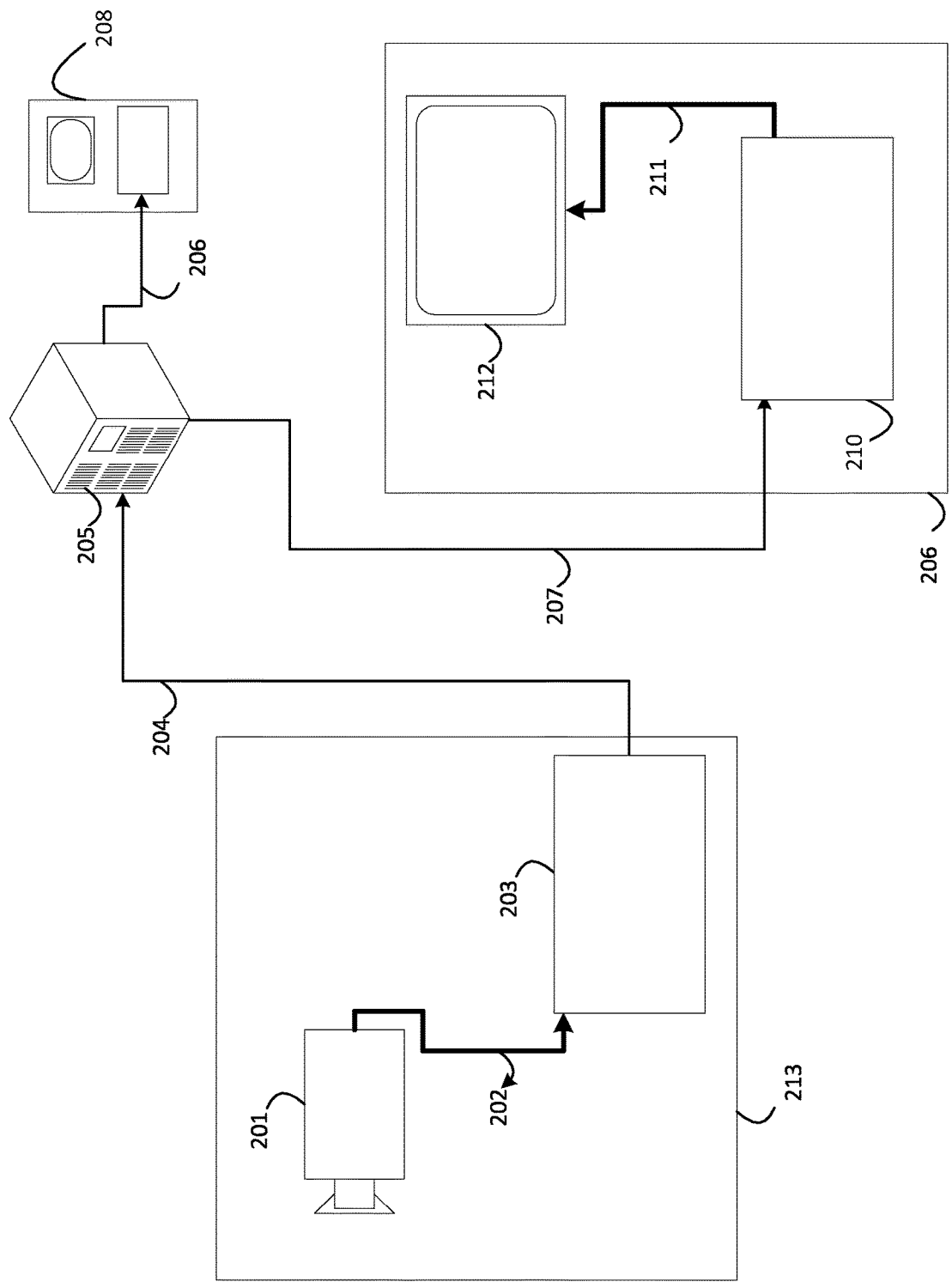
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
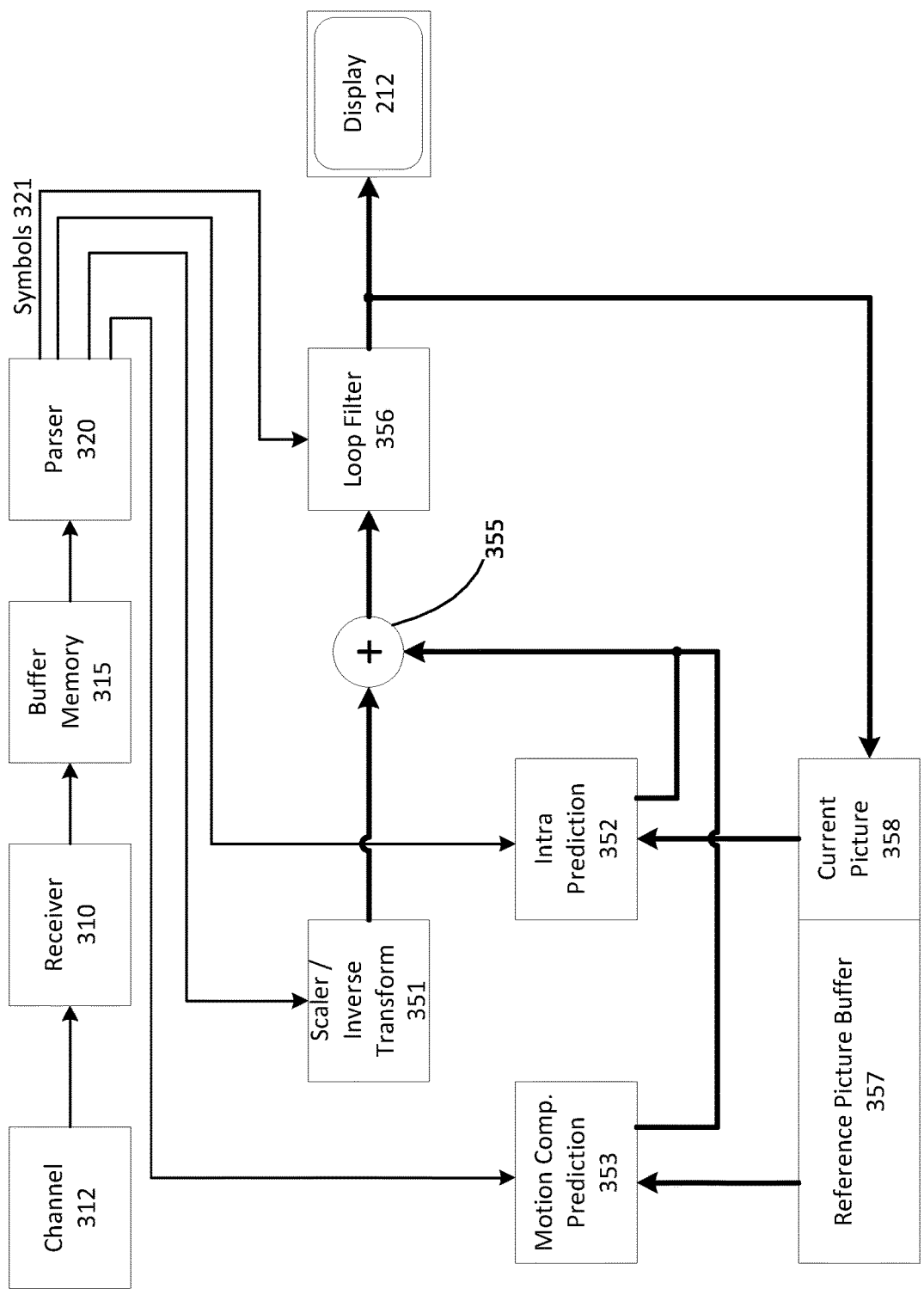
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
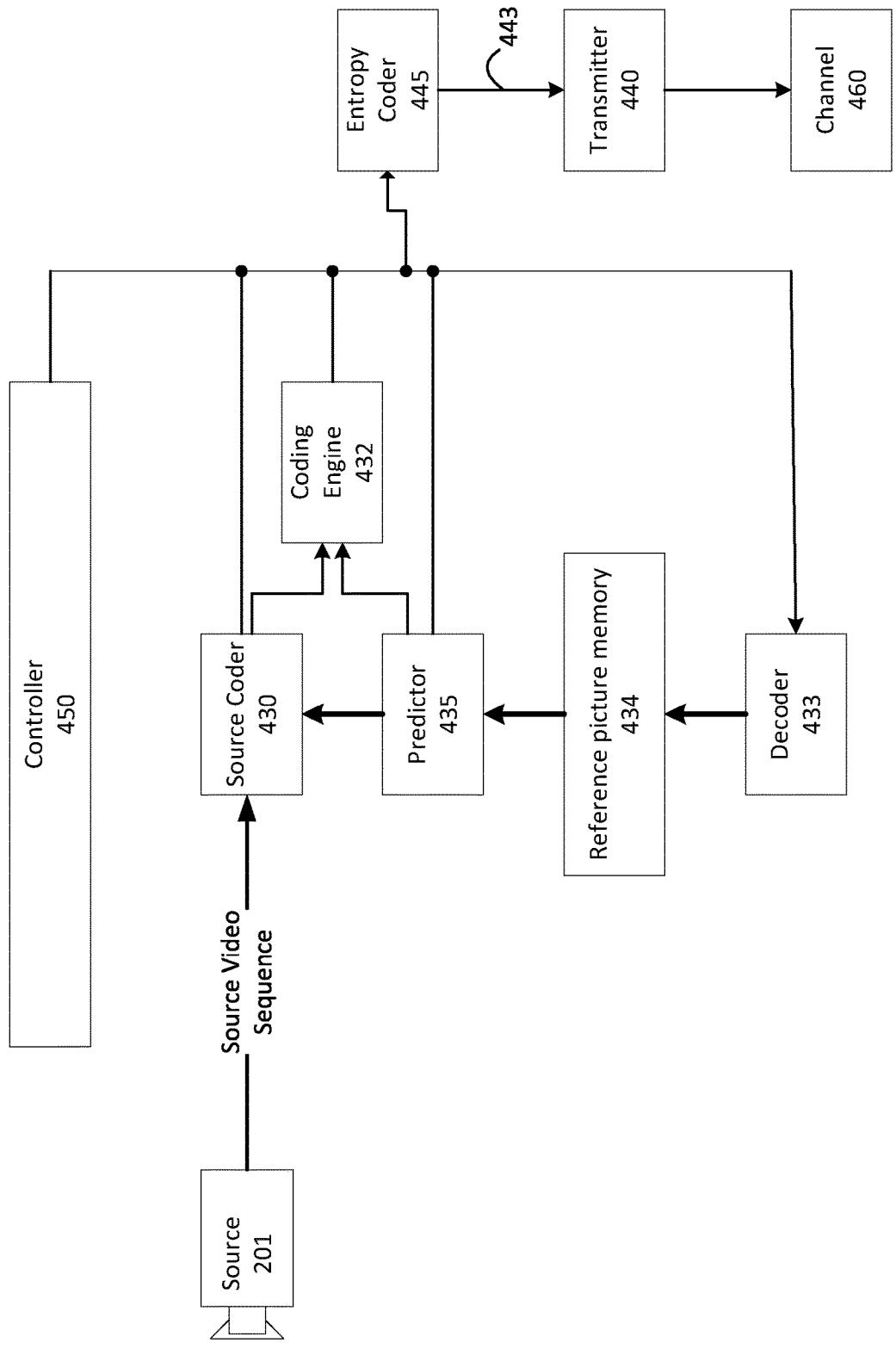
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Embodiments may relate to modifications of syntax and semantics related to picture headers. At least one embodiment may relate to signaling all_pic_coding_info_present_in_ph_flag in PPS as a gate flag to save some bits to specify whether the picture-level coding tool information is present in PH or SH. At least one embodiment may relate to correcting the identification of the first VCL NAL unit of a PU or AU. At least one embodiment may relate to modifications of the semantics of gdr_or_irap_pic_flag to cope with the case that mixed_nalu_types_flag is equal to 1

In embodiments, picture parameter set (PPS) may refer to a syntax structure containing syntax elements that apply to zero or more entire coded pictures as determined by a syntax element found in each slice header.

In embodiments, a picture header (PH) may refer to a syntax structure containing syntax elements that apply to all slices of a coded picture.

In embodiments a slice header (SH) may refer to a part of a coded slice containing the data elements pertaining to all tiles or coding tree unit (CTU) rows within a tile represented in the slice.

Embodiments may relate to a Video Coding Layer (VCL).

In embodiments, a network abstraction layer (NAL) unit, may refer to a syntax structure containing an indication of the type of data to follow and bytes containing that data in the form of a raw byte sequence payload (RBSP) interspersed as necessary with emulation prevention bytes.

In embodiments, a VCL NAL unit may refer to a collective term for coded slice NAL units and the subset of NAL units that have reserved values of nal_unit_type that are classified as VCL NAL units in this Specification.

In embodiments, a Picture Unit (PU) may refer to a set of NAL units that are associated with each other according to a specified classification rule, are consecutive in decoding order, and contain exactly one coded picture.

In embodiments, an access unit (AU) may refer to a set of PUs that belong to different layers and contain coded pictures associated with the same time for output from the decoded picture buffer (DPB).

Embodiments may relate to a sample adaptive offset (SAO).

In embodiments, an adaptive loop filter (ALF) may refer to a filtering process that is applied as part of the decoding process and is controlled by parameters conveyed in an adaptation parameter set (APS).

Embodiments may relate to a quantization parameter (QP).

Embodiments may relate to an intra random access point (IRAP).

Embodiments may relate to a gradual decoding refresh (GDR).

In embodiments, a GDR picture may refer to a picture for which each VCL NAL unit has nal_unit_type equal to GDR_NUT.

In the latest version of VVC draft (JVET-Q2001-vE), six flags may be used to indicate whether picture-level coding information is present in picture header or slice header in the PPS syntax structure. For example, rpl_info_in_ph_flag, dbf_info_in_ph_flag, sao_info_in_ph_flag and so on. In most cases, those values may have the same value, 0 or 1. It seems unlikely to have a different value for each xxx_info_in_ph_flag.

Therefore, in embodiments, a gate flag all_pic_coding_info_present_in_ph_flag may indicate the presence of those flags in PPS, to save bits in PPS. If the value of all_pic_coding_info_present_in_ph_flag is equal to 1, those xxx_info_in_ph_flags are not signaled and the values of those flags may be inferred to be equal to 1, because signaling the picture-level coding information in picture header could happen more frequently than signaling the information in slice header for slice-level control. An example of a syntax table consistent with embodiments is illustrated in FIG. 5.

In embodiments, all_pic_coding_info_present_in_ph_flag equal to 1 may specify that rpl_info_in_ph_flag, dbf_info_in_ph_flag, sao_info_in_ph_flag, alf_info_in_ph_flag, wp_info_in_ph_flag and qp_delta_info_in_ph_flag are not present in PPS. all_pic_coding_info_present_in_ph_flag equal to 0 may specify that rpl_info_in_ph_flag, dbf_info_in_ph_flag, sao_info_in_ph_flag, alf_info_in_ph_flag, wp_info_in_ph_flag and qp_delta_info_in_ph_flag are present in PPS.

In embodiments, rpl_info_in_ph_flag equal to 1 may specify that reference picture list information is present in the PH syntax structure and not present in slice headers referring to the PPS that do not contain a PH syntax structure. rpl_info_in_ph_flag equal to 0 may specify that reference picture list information is not present in the PH syntax structure and may be present in slice headers referring to the PPS that do not contain a PH syntax structure. When not present, the value of rpl_info_in_ph_flag may be inferred to be equal to 1.

In embodiments, dbf_info_in_ph_flag equal to 1 may specify that deblocking filter information is present in the PH syntax structure and not present in slice headers referring to the PPS that do not contain a PH syntax structure. dbf_info_in_ph_flag equal to 0 may specify that deblocking filter information is not present in the PH syntax structure and may be present in slice headers referring to the PPS that do not contain a PH syntax structure. When not present, the value of dbf_info_in_ph_flag may be inferred to be equal to 0. When not present, the value of dbf_info_in_ph_flag may be inferred to be equal to 1.

sao_info_in_ph_flag equal to 1 may specify that SAO filter information is present in the PH syntax structure and not present in slice headers referring to the PPS that do not contain a PH syntax structure. sao_info_in_ph_flag equal to 0 may specify that SAO filter information is not present in the PH syntax structure and may be present in slice headers referring to the PPS that do not contain a PH syntax structure. When not present, the value of sao_info_in_ph_flag may be inferred to be equal to 1.

alf_info_in_ph_flag equal to 1 may specify that ALF information is present in the PH syntax structure and not present in slice headers referring to the PPS that do not contain a PH syntax structure. alf_info_in_ph_flag equal to 0 may specify that ALF information is not present in the PH syntax structure and may be present in slice headers referring to the PPS that do not contain a PH syntax structure. When not present, the value of alf_info_in_ph_flag may be inferred to be equal to 1.

wp_info_in_ph_flag equal to 1 may specify that weighted prediction information may be present in the PH syntax structure and not present in slice headers referring to the PPS that do not contain a PH syntax structure. wp_info_in_ph_flag equal to 0 may specify that weighted prediction information is not present in the PH syntax structure and may be present in slice headers referring to the PPS that do not contain a PH syntax structure. When not present, the value of wp_info_in_ph_flag may be inferred to be equal to 0. When not present, the value of wp_info_in_ph_flag may be inferred to be equal to 1.

qp_delta_info_in_ph_flag equal to 1 may specify that QP delta information is present in the PH syntax structure and not present in slice headers referring to the PPS that do not contain a PH syntax structure. qp_delta_info_in_ph_flag equal to 0 may specify that QP delta information is not present in the PH syntax structure and may be present in slice headers referring to the PPS that do not contain a PH syntax structure. When not present, the value of qp_delta_info_in_ph_flag may be inferred to be equal to 1.

In the latest VVC spec. draft, it is not clear how to identify the first VCL NAL unit of a PU or AU. Embodiments may relate to the following modification of the descriptions of order of NAL units.

In embodiments, a VCL NAL unit is the first VCL NAL unit of an AU (and consequently the PU containing the VCL NAL unit is the first PU of the AU) when the VCL NAL unit is the first VCL NAL unit that follows a PH NAL unit or has picture_header_in_slice_header_flag equal to 1 and one or more of the following conditions are true:

The value of nuh_layer_id of the VCL NAL unit is less than the nuh_layer_id of the previous picture in decoding order.

The value of ph_pic_order_cnt_lsb of the VCL NAL unit differs from the ph_pic_order_cnt_lsb of the previous picture in decoding order.

PicOrderCntVal derived for the VCL NAL unit differs from the PicOrderCntVal of the previous picture in decoding order.

In embodiments, a flag gdr_or_irap_pic_flag in picture header indicates whether or not the current picture is an IRAP or GDR picture. When the value of gdr_or_irap_pic_flag is equal to 1, the flag no_output_of_prior_pics_flag may be present in picture header as well. When bitstreams of subpictures are merged, the value of no_output_of_prior_pics_flag of an IRAP subpicture needs to be kept for subpicture extraction. To address the issue, embodiments may relate to the following modification of the semantics of gdr_or_irap_pic_flag:

In embodiments, gdr_or_irap_pic_flag equal to 1 may specify that the current picture is a GDR or IRAP picture or a picture with a VCL NAL unit equal to IDR_W_RADL, IDR_N_LP or CRA_NUT and mixed_nalu_types_in_pic_flag equal to 1. gdr_or_irap_pic_flag equal to 0 may specify that the current picture may or may not be a GDR or IRAP picture.

In embodiments, gdr_or_irap_pic_flag equal to 1 may specify that the current picture is a GDR or IRAP picture, or a picture containing an IRAP subpicture with mixed_nalu_types_in_pic_flag equal to 1. gdr_or_irap_pic_flag equal to 0 may specify that the current picture may or may not be a GDR or IRAP picture.

In embodiments, gdr_or_irap_pic_flag equal to 1 may specify that the current picture is a GDR or IRAP picture. gdr_or_irap_pic_flag equal to 0 may specify that the current picture may or may not be a GDR or IRAP picture.

It may be a requirement of bitstream conformance that the value of gdr_or_irap_pic_flag shall be equal to 0, when mixed_nalu_types_in_pic_flag equal to 1.

Figure 6A:
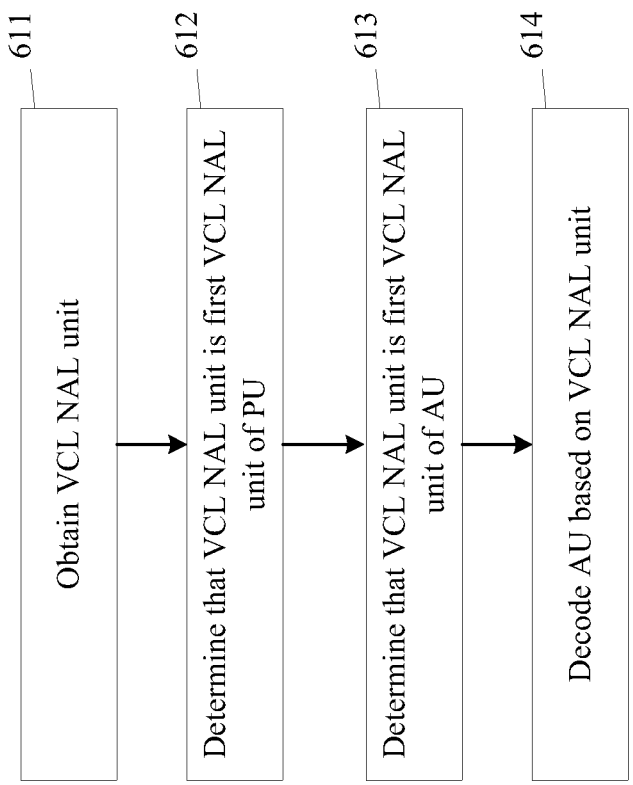
FIGS. 6A-6C are a flowcharts of example processes for decoding an encoded video bitstream in accordance with an embodiment.
Figure 6B:
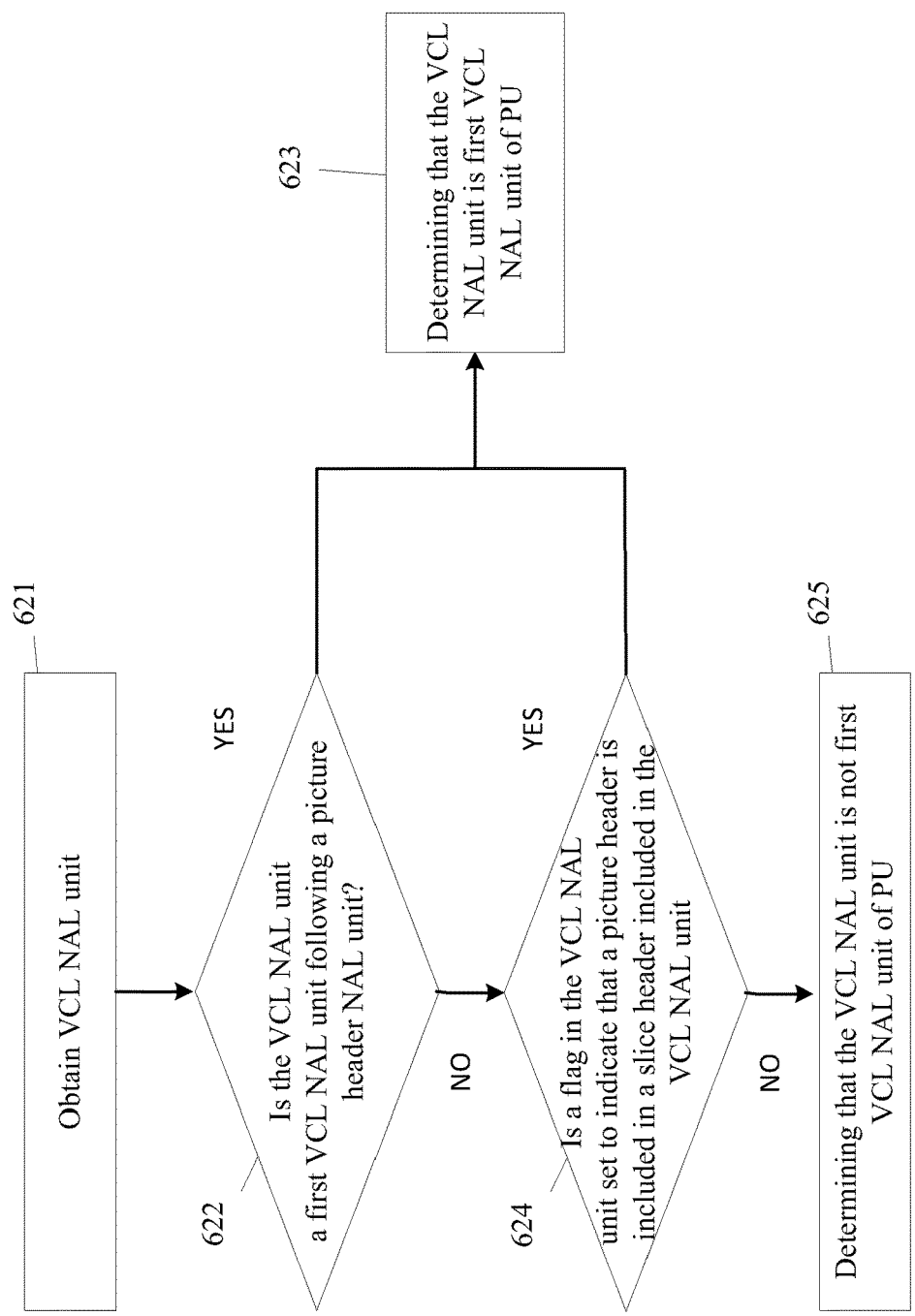
Figure 6C:
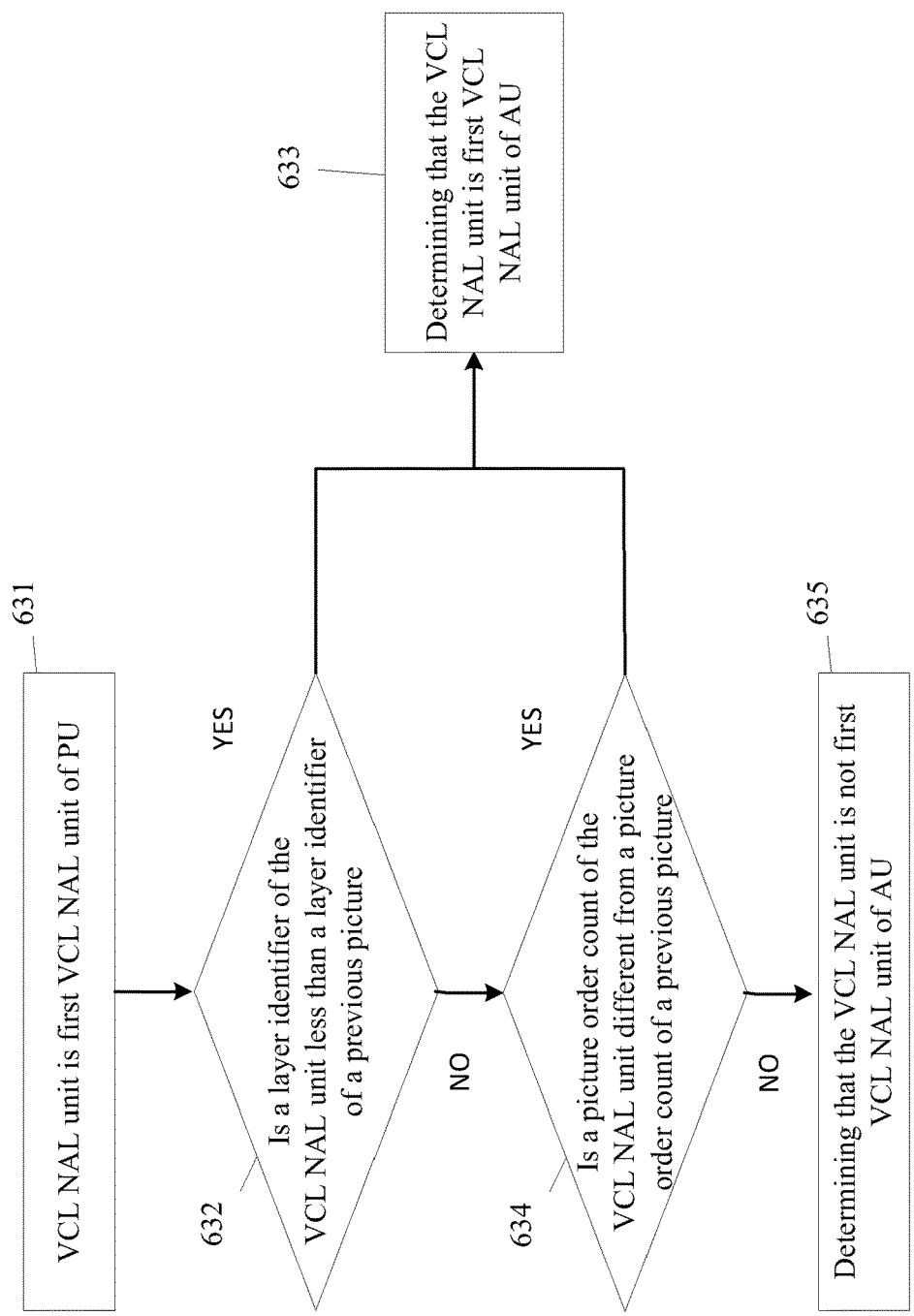

FIGS. 6A-6C are flowcharts of example processes 600A, 600B, and 600C for decoding an encoded video bitstream. In some implementations, one or more process blocks of FIGS. 6A-6C may be performed by decoder 210. In some implementations, one or more process blocks of FIGS. 6A-6C may be performed by another device or a group of devices separate from or including decoder 210, such as encoder 203.

In embodiments, one or more of the blocks illustrated in FIG. 6A may correspond to, or may be performed together with, one or more blocks of FIGS. 6B and 6C.

As shown in FIG. 6A, process 600A may include obtaining a video coding layer (VCL) network abstraction layer (NAL) unit (block 611).

As further shown in FIG. 6A, process 600A may include determining that the VCL NAL unit is a first VCL NAL unit of a picture unit (PU) containing the VCL NAL unit (block 612).

As further shown in FIG. 6A, process 600A may include, based on determining that the VCL NAL unit is the first VCL NAL unit of the PU, determining that the VCL NAL unit is a first VCL NAL unit of an access unit (AU) containing the PU (block 613).

As further shown in FIG. 6A, process 600A may include, based on determining that the VCL NAL unit is the first VCL NAL unit of the AU, decoding the AU based on the VCL NAL unit (block 614).

In embodiments, one or more of the blocks illustrated in FIG. 6B may correspond to, or may be performed together with, one or more blocks of FIGS. 6A and 6B.

As shown in FIG. 6B, process 600B may include obtaining a VCL NAL unit (block 621).

As further shown in FIG. 6B, process 600B may include determining whether the VCL NAL unit is a first VCL NAL unit following a picture header NAL unit (block 622).

As further shown in FIG. 6B, process 600B may include, based on determining that the VCL NAL unit is a first VCL NAL unit following a picture header NAL unit (YES at block 622), proceeding to block 623.

As further shown in FIG. 6B, process 600B may include, based on determining that the VCL NAL unit is not a first VCL NAL unit following a picture header NAL unit (NO at block 623), proceeding to block 624. In embodiments, process 600B may instead proceed to block 625.

As further shown in FIG. 6B, process 600B may include determining whether a flag in the VCL NAL unit is set to indicate that a picture header is included in a slice header included in the VCL NAL unit (block 624). In embodiments, the flag may correspond to picture_header_in_slice_header_flag As further shown in FIG. 6B, process 600B may include, based on determining that the flag in the VCL NAL unit is set to indicate that a picture header is included in a slice header included in the VCL NAL unit (YES at block 624), proceeding to block 623.

As further shown in FIG. 6B, process 600B may include, based on determining that the flag in the VCL NAL unit is not set to indicate that a picture header is included in a slice header included in the VCL NAL unit (NO at block 624), proceeding to block 625.

As further shown in FIG. 6B, process 600B may include determining that the VCL NAL unit is a first VCL NAL unit of the PU containing the VCL NAL unit (block 623).

As further shown in FIG. 6B, process 600B may include determining that the VCL NAL unit is not a first VCL NAL unit of the PU containing the VCL NAL unit (block 625).

In embodiments, one or more of the blocks illustrated in FIG. 6C may correspond to, or may be performed together with, one or more blocks of FIGS. 6A and 6C.

As shown in FIG. 6C, process 600C may include determining that a VCL NAL unit is a first VCL NAL unit of a PU (block 631).

As further shown in FIG. 6C, process 600C may include determining whether a layer identifier of the VCL NAL unit less than a layer identifier of a previous picture (block 632).

As further shown in FIG. 6C, process 600C may include, based on determining that a layer identifier of the VCL NAL unit is less than a layer identifier of a previous picture (YES at block 632), proceeding to block 633.

As further shown in FIG. 6C, process 600C may include, based on determining that a layer identifier of the VCL NAL unit is not less than a layer identifier of a previous picture (NO at block 633), proceeding to block 634. In embodiments, process 600C may instead proceed to block 635.

As further shown in FIG. 6C, process 600C may include determining whether a picture order count of the VCL NAL unit different from a picture order count of a previous picture (block 634). In embodiments, this may be determined based on least significant bits (LSBs) of the picture order counts.

As further shown in FIG. 6C, process 600C may include, based on determining that the picture order count of the VCL NAL unit is different from a picture order count of a previous picture (YES at block 634), proceeding to block 633.

As further shown in FIG. 6C, process 600C may include, based on determining that picture order count of the VCL NAL unit is not different from a picture order count of a previous picture (NO at block 634), proceeding to block 635.

As further shown in FIG. 6C, process 600C may include determining that the VCL NAL unit is a first VCL NAL unit of the AU containing the VCL NAL unit (block 633).

As further shown in FIG. 6C, process 600C may include determining that the VCL NAL unit is not a first VCL NAL unit of the AU containing the VCL NAL unit (block 635).

In embodiments, based on a flag indicating that all picture coding information is present in a picture header, a plurality of flags corresponding to the picture coding information may be not signaled. In embodiments, the flag may correspond to all_pic_coding_info_present_in_ph_flag.

Although FIGS. 6A-6C shows example blocks of processes 600A-600C, in some implementations, processes 600A-600C may include additional blocks, fewer blocks, different blocks, or differently arranged blocks than those depicted in FIGS. 6A-6C. Additionally, or alternatively, two or more of the blocks of processes 600A-600C may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above can be implemented as computer software using computer-readable instructions and physically stored in one or more computer-readable media. For example, FIG. 7 shows a computer system 700 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 700.

Computer system 700 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 701, mouse 702, trackpad 703, touch screen 710 and associated graphics adapter 750, data-glove, joystick 705, microphone 706, scanner 707, camera 708.

Computer system 700 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 710, data-glove, or joystick 705, but there can also be tactile feedback devices that do not serve as input devices), audio output devices (such as: speakers 709, headphones (not depicted)), visual output devices (such as screens 710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 700 can also include human accessible storage devices and their associated media such as optical media including CD/DVD ROM/RW 720 with CD/DVD or the like media 721, thumb-drive 722, removable hard drive or solid state drive 723, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 700 can also include interface(s) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (1154) that attached to certain general purpose data ports or peripheral buses (1149) (such as, for example universal serial bus (USB) ports of the computer system 700; others are commonly integrated into the core of the computer system 700 by attachment to a system bus as described below (for example Ethernet interface into a PC computer system or cellular network interface into a smartphone computer system). As an example, network 755 may be connected to peripheral bus 749 using network interface 754. Using any of these networks, computer system 700 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (1154) as described above.

Aforementioned human interface devices, human-accessible storage devices, and network interfaces can be attached to a core 740 of the computer system 700.

The core 740 can include one or more Central Processing Units (CPU) 741, Graphics Processing Units (GPU) 742, specialized programmable processing units in the form of Field Programmable Gate Areas (FPGA) 743, hardware accelerators 744 for certain tasks, and so forth. These devices, along with Read-only memory (ROM) 745, Random-access memory (RAM) 746, internal mass storage such as internal non-user accessible hard drives, solid-state drives (SSDs), and the like 747, may be connected through a system bus 748. In some computer systems, the system bus 748 can be accessible in the form of one or more physical plugs to enable extensions by additional CPUs, GPU, and the like. The peripheral devices can be attached either directly to the core's system bus 748, or through a peripheral bus 749. Architectures for a peripheral bus include peripheral component interconnect (PCI), USB, and the like.

CPUs 741, GPUs 742, FPGAs 743, and accelerators 744 can execute certain instructions that, in combination, can make up the aforementioned computer code. That computer code can be stored in ROM 745 or RAM 746. Transitional data can be also stored in RAM 746, whereas permanent data can be stored for example, in the internal mass storage 747. Fast storage and retrieve to any of the memory devices can be enabled through the use of cache memory, that can be closely associated with one or more CPU 741, GPU 742, mass storage 747, ROM 745, RAM 746, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 700, and specifically the core 740 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 740 that are of non-transitory nature, such as core-internal mass storage 747 or ROM 745. The software implementing various embodiments of the present disclosure can be stored in such devices and executed by core 740. A computer-readable medium can include one or more memory devices or chips, according to particular needs. The software can cause the core 740 and specifically the processors therein (including CPU, GPU, FPGA, and the like) to execute particular processes or particular parts of particular processes described herein, including defining data structures stored in RAM 746 and modifying such data structures according to the processes defined by the software. In addition or as an alternative, the computer system can provide functionality as a result of logic hardwired or otherwise embodied in a circuit (for example: accelerator 744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:
1. A method of encoding a video bitstream using at least one processor, the method comprising:
   determining whether a video coding layer (VCL) network abstraction layer (NAL) unit is to be a first VCL NAL unit of a picture unit (PU) containing the VCL NAL unit;
   based on determining that the VCL NAL unit is to be the first VCL NAL unit of the PU, determining whether the VCL NAL unit is to be a first VCL NAL unit of an access unit (AU) containing the PU; and based on determining that the VCL NAL unit is to be the first VCL NAL unit of the AU, encoding the AU based on the VCL NAL unit, wherein based on a value of all_pic_coding_info_present_in_ph_flag indicating that all picture coding information is to be present in a picture header, a plurality of flags corresponding to the picture coding information are determined to not be signaled in a picture parameter set corresponding to the picture header, and wherein the plurality of flags comprise an rpl_info_in_ph_flag, an_wp_info_in_ph_flag, and at least one of a dbf_info_in_ph_flag, an sao_info_in_ph_flag, an alf_info_in_ph_flag, and a qp_delta_info_in_ph_flag.

2. The method of claim 1, the method further comprising determining, based on determining that the VCL NAL unit is to be the first VCL NAL unit of the AU, that one or more conditions of a plurality of conditions are true, the plurality of conditions comprising:
  (1) a first value of nuh_layer_id of the VCL NAL unit is to be less than or equal to a second value of nuh_layer_id of a previous picture in decoding order,
  (2) a first value of ph_pic_order_cnt_lsb of the VCL NAL unit is to differ from a second value of ph_pic_order_cnt_lsb of the previous picture in decoding order, and
  (3) a first picture order count value derived for the VCL NAL unit is to differ from a second picture order count value of the previous picture in decoding order; and
  based on the determining that the one or more conditions are true, encoding the AU based on the VCL NAL unit.

3. The method of claim 1, wherein determining that the VCL NAL unit is to be the first VCL NAL unit of the PU is based on at least one of:
  determining that the VCL NAL unit is to be a first VCL NAL unit following a picture header NAL unit, and
  determining that a flag in the VCL NAL unit is to be set to indicate that a picture header is included in a slice header included in the VCL NAL unit.

4. The method of claim 1, wherein determining that the VCL NAL unit is to be the first VCL NAL unit of the AU is based on determining that the VCL NAL unit is to be the first VCL NAL unit of the PU, and determining that a layer identifier of the VCL NAL unit is to be less than another layer identifier.

5. The method of claim 1, wherein determining that the VCL NAL unit is to be the first VCL NAL unit of the AU is based on determining that the VCL NAL unit is to be the first VCL NAL unit of the PU, and determining that a picture order count of the VCL NAL unit is to be different from another picture order count.

6. The method of claim 1, wherein determining that the VCL NAL unit is to be the first VCL NAL unit of the AU is based on determining that the VCL NAL unit is to be the first VCL NAL unit of the PU, and determining that a least significant bit of a picture order count of the VCL NAL unit is to be different from another least significant bit of another picture order count.

7. A device for encoding a video bitstream, the device comprising:
  at least one memory configured to store program code; and
  at least one processor configured to read the program code and operate as instructed by the program code, the program code including:
  first determining code configured to cause the at least one processor to determine whether a video coding layer (VCL) network abstraction layer (NAL) unit is to be a first VCL NAL unit of a picture unit (PU) containing the VCL NAL unit;
  second determining code configured to cause the at least one processor to, based on determining that the VCL NAL unit is to be the first VCL NAL unit of the PU, determine whether the VCL NAL unit is to be a first VCL NAL unit of an access unit (AU) containing the PU; and
  encoding code configured to cause the at least one processor to, based on determining that the VCL NAL unit is to be the first VCL NAL unit of the AU, encode the AU based on the VCL NAL unit,
  wherein based on a value of all_pic_coding_info_present_in_ph_flag indicating that all picture coding information is to be present in a picture header, a plurality of flags corresponding to the picture coding information are determined to not be signaled in a picture parameter set corresponding to the picture header, and
  wherein the plurality of flags comprise an rpl_info_in_ph_flag, an_wp_info_in_ph_flag, and at least one of a dbf_info_in_ph_flag, an sao_info_in_ph_flag, an alf_info_in_ph_flag, and a qp_delta_info_in_ph_flag.

8. The device of claim 7, wherein the program code further includes:
  third determining code configured to cause the at least one processor to, based on determining that the VCL NAL unit is to be the first VCL NAL unit of the AU, determine that one or more conditions of a plurality of conditions are true, the plurality of conditions comprising:
  (1) a first value of nuh_layer_id of the VCL NAL unit is to be less than or equal to a second value of nuh_layer_id of a previous picture in decoding order,
  (2) a first value of ph_pic_order_cnt_lsb of the VCL NAL unit is to differ from a second value of ph_pic_order_cnt_lsb of the previous picture in decoding order, and
  (3) a first picture order count value derived for the VCL NAL unit is to differ from a second picture order count value of the previous picture in decoding order; and
  the decoding code is further configured to cause the at least one processor to, based on the determining that the one or more conditions are true, encode the AU based on the VCL NAL unit.

9. The device of claim 7, wherein determining that the VCL NAL unit is to be the first VCL NAL unit of the PU is based on at least one of:
  determining that the VCL NAL unit is to be a first VCL NAL unit following a picture header NAL unit, and
  determining that a flag in the VCL NAL unit is to be set to indicate that a picture header is included in a slice header included in the VCL NAL unit.

10. The device of claim 7, wherein determining that the VCL NAL unit is to be the first VCL NAL unit of the AU is based on determining that the VCL NAL unit is to be the first VCL NAL unit of the PU, and determining that a layer identifier of the VCL NAL unit is to be less than another layer identifier.

11. The device of claim 7, wherein determining that the VCL NAL unit is to be the first VCL NAL unit of the AU is based on determining that the VCL NAL unit is to be the first VCL NAL unit of the PU, and determining that a picture order count of the VCL NAL unit is to be different from another picture order count.

12. The device of claim 7, wherein determining that the VCL NAL unit is to be the first VCL NAL unit of the AU is based on determining that the VCL NAL unit is to be the first VCL NAL unit of the PU, and determining that a least significant bit of a picture order count of the VCL NAL unit is to be different from another least significant bit of another picture order count.

13. A non-transitory computer-readable medium storing instructions, the instructions comprising: one or more instructions that, when executed by one or more processors of a device for encoding a video bitstream, cause the one or more processors to:

determine whether a VCL NAL unit is to be a first VCL NAL unit of a picture unit (PU) containing the VCL NAL unit;

based on determining that the VCL NAL unit is to be the first VCL NAL unit of the PU, determine whether the VCL NAL unit is to be a first VCL NAL unit of an access unit (AU) containing the PU; and based on determining that the VCL NAL unit is to be the first VCL NAL unit of the AU, encode the AU based on the VCL NAL unit, wherein based on a value of all_pic_coding_info_present_in_ph_flag indicating that all picture coding information is to be present in a picture header, a plurality of flags corresponding to the picture coding information are determined to not be signaled in a picture parameter set corresponding to the picture header, and wherein the plurality of flags comprise an rpl_info_in_ph_flag, an_wp_info_in_ph_flag, and at least one of a dbf_info_in_ph_flag, an sao_info_in_ph_flag, an alf_info_in_ph_flag, and a qp_delta_info_in_ph_flag.

14. The non-transitory computer-readable medium of claim 13, wherein the one or more instructions that, when executed by one or more processors of the device for encoding the video bitstream, further cause the one or more processors to:

based on determining that the VCL NAL unit is to be the first VCL NAL unit of the AU, determine that one or more conditions of the a plurality of conditions are true, the plurality of conditions comprising:

(1) a first value of nuh_layer_id of the VCL NAL unit is to be less than or equal to a second value of nuh_layer_id of a previous picture in decoding order, (2) a first value of ph_pic_order_cnt_lsb of the VCL NAL unit is to differ from a second value of ph_pic_order_cnt_lsb of the previous picture in decoding order, and (3) a first picture order count value derived for the VCL NAL unit is to differ from a second picture order count value of the previous picture in decoding order; and based on the determining that the one or more conditions are true, encode the AU based on the VCL NAL unit.

15. The non-transitory computer-readable medium of claim 13, wherein determining that the VCL NAL unit is to be the first VCL NAL unit of the PU is based on at least one of:

determining that the VCL NAL unit is to be a first VCL NAL unit following a picture header NAL unit, and determining that a flag in the VCL NAL unit is to be set to indicate that a picture header is included in a slice header included in the VCL NAL unit.

16. The non-transitory computer-readable medium of claim 13, wherein determining that the VCL NAL unit is to be the first VCL NAL unit of the AU is based on determining that the VCL NAL unit is to be the first VCL NAL unit of the PU, and determining that a layer identifier of the VCL NAL unit is to be less than another layer identifier.

17. The non-transitory computer-readable medium of claim 13, wherein determining that the VCL NAL unit to be the first VCL NAL unit of the AU is based on determining that the VCL NAL unit is to be the first VCL NAL unit of the PU, and determining that a picture order count of the VCL NAL unit is to be different from another picture order count.

* * * * *